(12) United States Patent
Hashemi et al.

(10) Patent No.: US 6,282,188 B1
(45) Date of Patent: Aug. 28, 2001

(54) SCALABLE HUB

(75) Inventors: Hossein Hashemi, Mission Viejo; Karl M. Henson, Rancho Santa Margarita; David Brewer, Anaheim, all of CA (US)

(73) Assignee: Emulex Corporation, Costa Mesa, CA (US)

( * ) Notice: Subject to any disclaimer, the term of this patent is extended or adjusted under 35 U.S.C. 154(b) by 0 days.

(21) Appl. No.: 09/071,508

(22) Filed: May 1, 1998

(51) Int. Cl.[7] .................................................. H04L 12/28
(52) U.S. Cl. ............................................ 370/351; 370/360
(58) Field of Search ..................................... 370/351, 360, 370/401, 402, 407, 216, 438, 408, 462, 445, 254

(56) References Cited

U.S. PATENT DOCUMENTS

| | | | |
|---|---|---|---|
| 4,733,391 | * | 3/1988 | Godbold et al. ................. 370/88 |
| 5,495,580 | | 2/1996 | Osman . |
| 5,522,047 | | 5/1996 | Grow et al. . |
| 5,638,512 | | 6/1997 | Osman et al. . |
| 5,659,718 | | 8/1997 | Osman et al. . |

OTHER PUBLICATIONS

Fiber Channel Tutorial, http://www.fibrechannel.com/technology/tutorial.htm.
Fibre Channel Overview, http://www.cern.ch/HSI/fcs/spec/overview.htm.
Fibre Channel Glossary, http://www.iol.unh.edu/training/fc/fcglossary.html.

* cited by examiner

Primary Examiner—Jessica J. Harrison
Assistant Examiner—Kim T. Nguyen
(74) Attorney, Agent, or Firm—Fish & Richardson P.C.

(57) ABSTRACT

A scalable hub divided into a plurality of internal hubs. Each internal hub is connected to a subsequent internal hub in a loop topology. The connection point for each internal hub to the interhub loop is a port which either bypasses that internal hub, isolating the disconnected internal hub, or connects that internal hub to the interhub loop, such that data flows between that internal hub and the interhub loop. In addition the preferred embodiment provides graceful degradation when an internal hub connected to the interhub loop fails.

8 Claims, 3 Drawing Sheets

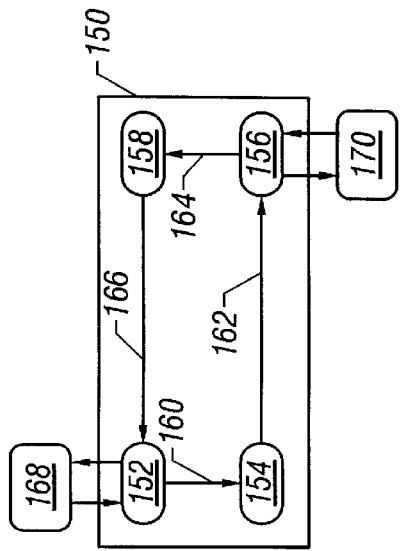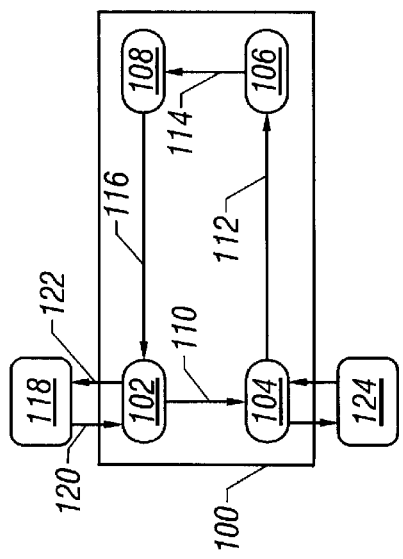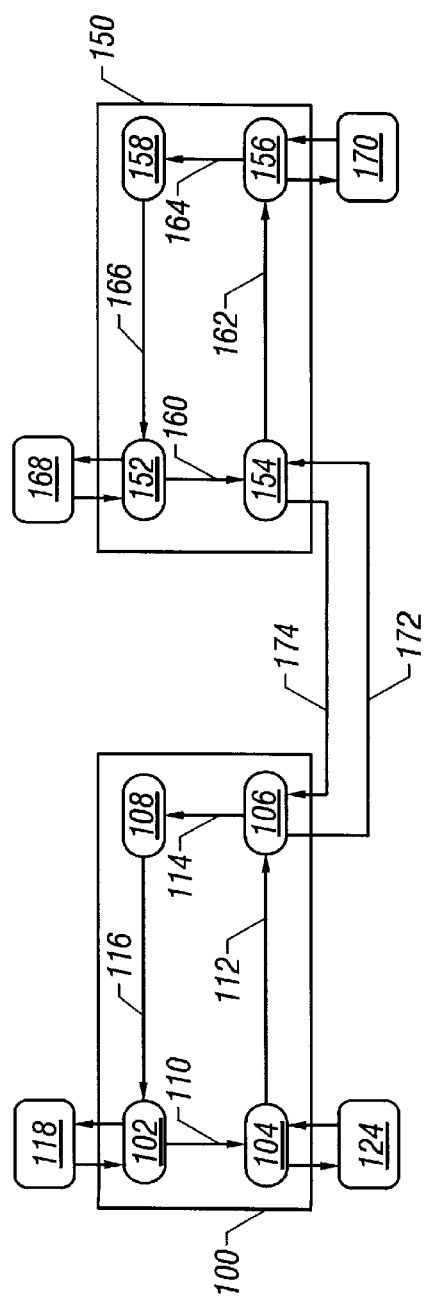
FIG. 1A (Prior Art)
FIG. 1B (Prior Art)

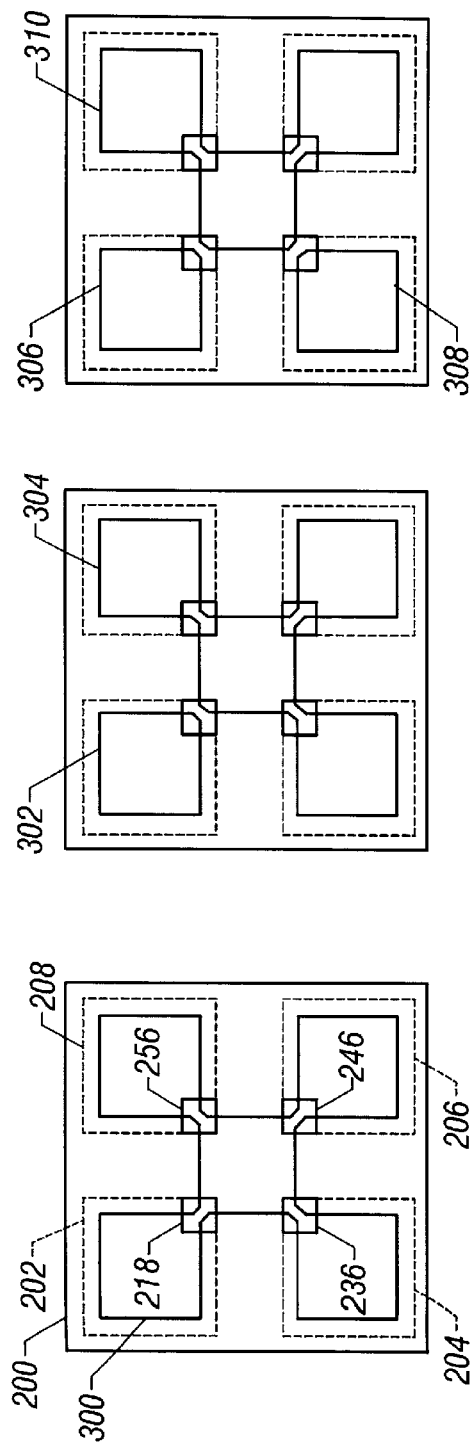
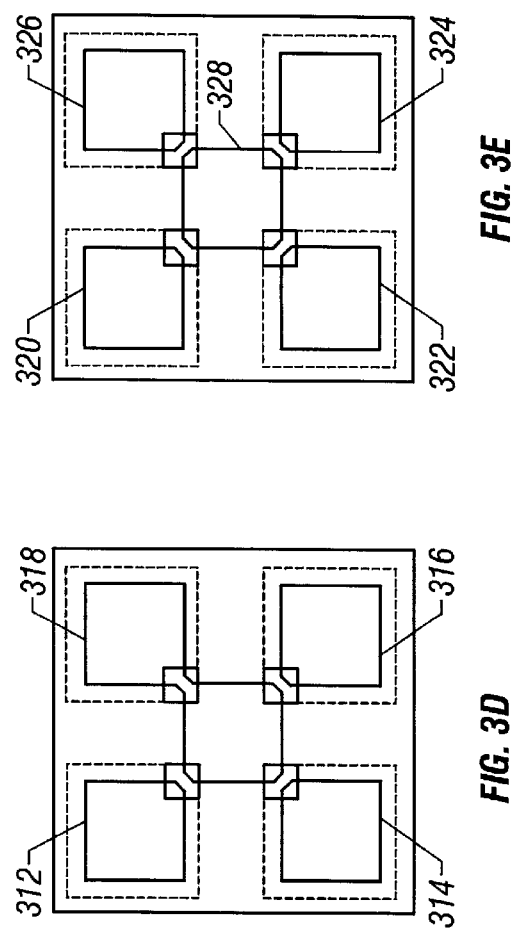

SCALABLE HUB

TECHNICAL FIELD

The present invention relates to an electronic network switching device, and more particularly to a hub device used in a network loop architecture and which includes a plurality of interconnected internal hubs which may operate in conjunction to form a unified loop or subsets of the available interconnections.

BACKGROUND INFORMATION

Electronic data systems are frequently interconnected using network communication Systems. Area-wide networks and channels are two approaches that have been developed for computer network architectures. Traditional networks (e.g., LAN's and WAN's) offer a great deal of flexibility and relatively large distance capabilities. Channels, such as the Enterprise System Connection (ESCON) and the Small Computer System Interface (SCSI), have been developed for high performance and reliability. Channels typically use dedicated short-distance connections between computers or between computers and peripherals.

Features of both channels and networks have been incorporated into a new network standard known as "Fibre Channel". Fibre Channel systems combine the speed and reliability of channels with the flexibility and connectivity of networks. Fibre Channel products currently can run at very high data rates, such as 266 Mbps or 1062 Mbps. These speeds are sufficient to handle quite demanding applications, such as uncompressed, full motion, high-quality video. ANSI specifications, such as X3.230-1994, define the Fibre Channel network. This specification distributes Fibre Channel functions among five layers. The five functional layers of the Fibre Channel are: FC-0—the physical media layer; FC-1—the coding and encoding layer; FC-2—the actual transport mechanism, including the framing protocol and flow control between nodes; FC-3—the common services layer; and FC-4—the upper layer protocol.

There are generally three ways to deploy a Fibre Channel network: simple point-to-point connections; arbitrated loops; and switched fabrics. The simplest topology is the point-to-point configuration, which simply connects any two Fibre Channel systems directly. Arbitrated loops are Fibre Channel ring connections that provide shared access to bandwidth via arbitration. Switched Fibre Channel networks, called "fabrics", are a form of cross-point switching.

Conventional Fibre Channel Arbitrated Loop ("FC-AL") protocols provide for loop functionality in the interconnection of devices or loop segments through node ports. However, direct interconnection of node ports is problematic in that a failure at one node port in a loop typically causes the failure of the entire loop. This difficulty is overcome in conventional Fibre Channel technology through the use of hubs. Hubs include a number of hub ports interconnected in a loop topology. Node ports are connected to hub ports, forming a star topology with the hub at the center. Hub ports which are not connected to node ports or which are connected to failed node ports are bypassed. In this way, the loop is maintained despite removal or failure of node ports.

FIG. 1A illustrates two conventional hubs with attached node ports, where a node port represents a connection to a single operational device or may represent a loop segment of a series of devices directly interconnected. Each node port typically has two data channels, one data channel carrying data from the hub port to the node port, and one data channel carrying data from the node port to the hub port.

In FIG. 1A, hub 100 has four hub ports 102, 104, 106, 108 (the number of hub ports shown in the hubs of figures herein is for illustrative purposes only and is not a limitation on the operation or construction of hubs according to embodiments within the scope of the present invention). Hub ports 102–108 of hub 100 are interconnected by a series of internal hub links 110, 112, 114, 116. In this way, hub ports 102–108 are connected in a loop topology by internal hub links 110–116. The data path of the loop flows: from hub port 102 through internal hub link 110 to hub port 104; out to node port 124 and back to hub port 104; through internal hub link 112 to hub port 106; through internal hub link 114 to hub port 108; through internal hub link 116 to hub port 102; out to node port 118 and back to hub port 102, completing the loop.

Node ports are attached to hub 100 in a physical star topology. However, the internal loop topology of hub 100 provided by the interconnection of hub ports 102–108 provides an effective loop topology for node ports attached tb hub 100. A node port 118 is attached to hub 100 at hub port 102. A data channel 120 carries data from node port 118 to hub port 102. A data channel 122 carries data from hub port 102 to node port 118. These data channels 120, 122 create the connection between node port 118 and the loop internal to hub 100. A second node port 124 is also attached to hub 100 at hub port 104 with data channels in the same way.

FIG. 1A also shows a second hub 150. Hub 150, similar to hub 100, contains four hub ports 152, 154, 156, 158 which are interconnected by internal hub links 160, 162, 164, 166 in a loop topology. Two node ports 168, 170 are attached to hub 150 at hub ports 152 and 156, respectively, with pairs of data channels. As shown in FIG. 1A, hub 100 and hub 150 form two independent loops. Thus, node port 118 and node port 124 can communicate, node port 168 and port 170 can communicate, but node port 118 has no connection to node ports 168 or 170.

A conventional technique for joining the loops contained within hub 100 and hub 150 is illustrated in FIG. 1B. As described above, each hub port of a hub has two data channels which are available to connect the hub port to a node port (recall in FIG. 1A, data channel 120 carries data from node port 118 to hub port 102 and data channel 122 carries data from hub port 102 to node port 118). In FIG. 1B, the connection of hub 100 to hub 150 is accomplished by linking data channels of two hub ports, one hub port from each hub. In FIG. 1B, two data channels 172, 174 connect hub port 106 of hub port 100 to hub port 164 of hub 150. Data channel 172 carries data channel from hub port 106 to hub port 154. Data channel 174 carries data from hub port 154 to hub port 106. Data channels 172, 174 perform a similar function to internal hub links 110–116, 160–166, carrying data from one hub port to the next hub port in the loop. This interconnection between hub ports 106 and 154 connects the loops contained within hubs 100 and 150.

The datapath throughout the linked loop topology follows a circular pattern of hub ports and no deports: 102, 104, 124, 104, 106, 154, 156, 170, 156, 158, 152, 168, 152, 154, 106, 108, 102, 118, 102. In this sense, hub ports 106 and 154 act as a common juncture between the two loops defined by hubs 100 and 150. In contrast to the configuration in FIG. 1A, in FIG. 1B node port 118 can communicate with any of the other node ports in the expanded loop: node port 124, node port 168 and node port 170.

A problem with the technique illustrated in FIG. 1B is that each hub must dedicate at least one hub port to the linking operations and connections between hubs. In this event, the logic and circuitry internal to a hub port, which is designed to interact with a node port or loop segment, is rendered idle and wasted.

In addition, the connection and disconnection of hubs, which are connected as illustrated in FIG. 1B, is sometimes a logistically complicated physical process involving the actual movement of cable or devices. Another problematic aspect of the hub port to hub port connection illustrated in FIG. 1B is that such a connection process is only useful to join separate hubs. It may be desirable to divide a hub into smaller pieces in order to increase the granularity of the loop element. The solution of hub port to hub port interconnection illustrated in FIG. 1B does not offer any help for this problem.

The inventors have determined that it would be desirable to have a scalable hub port which provides programmable scalability in joining or separating a group of internal hubs to a single scalable hub. In addition, the inventors have determined it would be desirable to provide a scalable hub which allows this expansion and scalability without using hub ports and their associated hub port logic.

SUMMARY

The present invention provides a scalable hub. The scalable hub of the preferred embodiment includes a plurality of internal hubs. Each internal hub, similar to a conventional hub, includes one or more hub ports interconnected in a loop topology. The internal hubs of a scalable hub each also include an internal hub expansion port. The internal hub expansion ports of the internal hubs may be interconnected in an interhub loop by interhub loop channels.

The internal hub expansion ports are each part of the loop of the internal hub. Thus, an internal hub expansion port is connected to the loop of an internal hub and to the interhub loop. An interhub bypass flag is provided for each internal hub expansion port. If the interhub bypass flag for an internal hub expansion port is set, data flowing on the internal hub loop of the internal hub passes through the expansion port and does not enter the interhub loop. If the interhub bypass flag is not set, then the internal hub containing that internal hub expansion port is connected to the interhub loop. Data passes along the interhub loop from that internal hub to the internal hub expansion port of the next internal hub. The interhub loop forms a uni-directional loop topology linking the interhub expansion ports of the internal hubs included in the scalable hub. This architecture allows for the inclusion and exclusion of internal hubs from the interhub loop of the scalable hub using the interhub bypass flags.

The internal hub expansion ports of the scalable hub of the preferred embodiment are generally simpler and thus less expensive than the circuits and logic which comprise a hub port. As a result, the waste of hub port circuitry induced by hub port to hub port connections as illustrated in FIG. 1B is avoided by the interconnection of internal hubs through the use of internal hub expansion ports.

In addition, the connection of internal hub expansion ports is preferably hardwired into the structure of the scalable hub. The connection or disconnection of an internal hub does not require physical alteration to the configuration, but is instead controlled by setting or resetting an associated interhub bypass flag. The use of a flag allows for simple connection or removal of internal hubs to the interhub loop of the scalable hub.

The preferred embodiment also provides for graceful degradation of a scalable hub in the event of failure of an internal hub. In a situation where all the internal hubs of a scalable hub are connected to the interhub loop (ie., all of the internal hubs were operating as a single hub), when one of the internal hubs fails, rather than the entire group of internal hubs breaking into isolated unitary hubs, the preferred embodiment provides for graceful degradation in that only the failed hub is removed from the interhub loop. The remainder of the internal hubs which were previously connected to the interhub loop remain connected to the interhub loop and only the failed hub is isolated.

BRIEF DESCRIPTION OF DRAWINGS

FIG. 1A shows a prior art configuration of two loops including hubs.

FIG. 1B shows a prior art configuration two loops including hubs which are connected.

FIG. 3A to 3E show datapaths resulting from varying combinations of setting interhub bypass flags in a scalable hub of the preferred embodiment.

DETAILED DESCRIPTION

Figure 2:
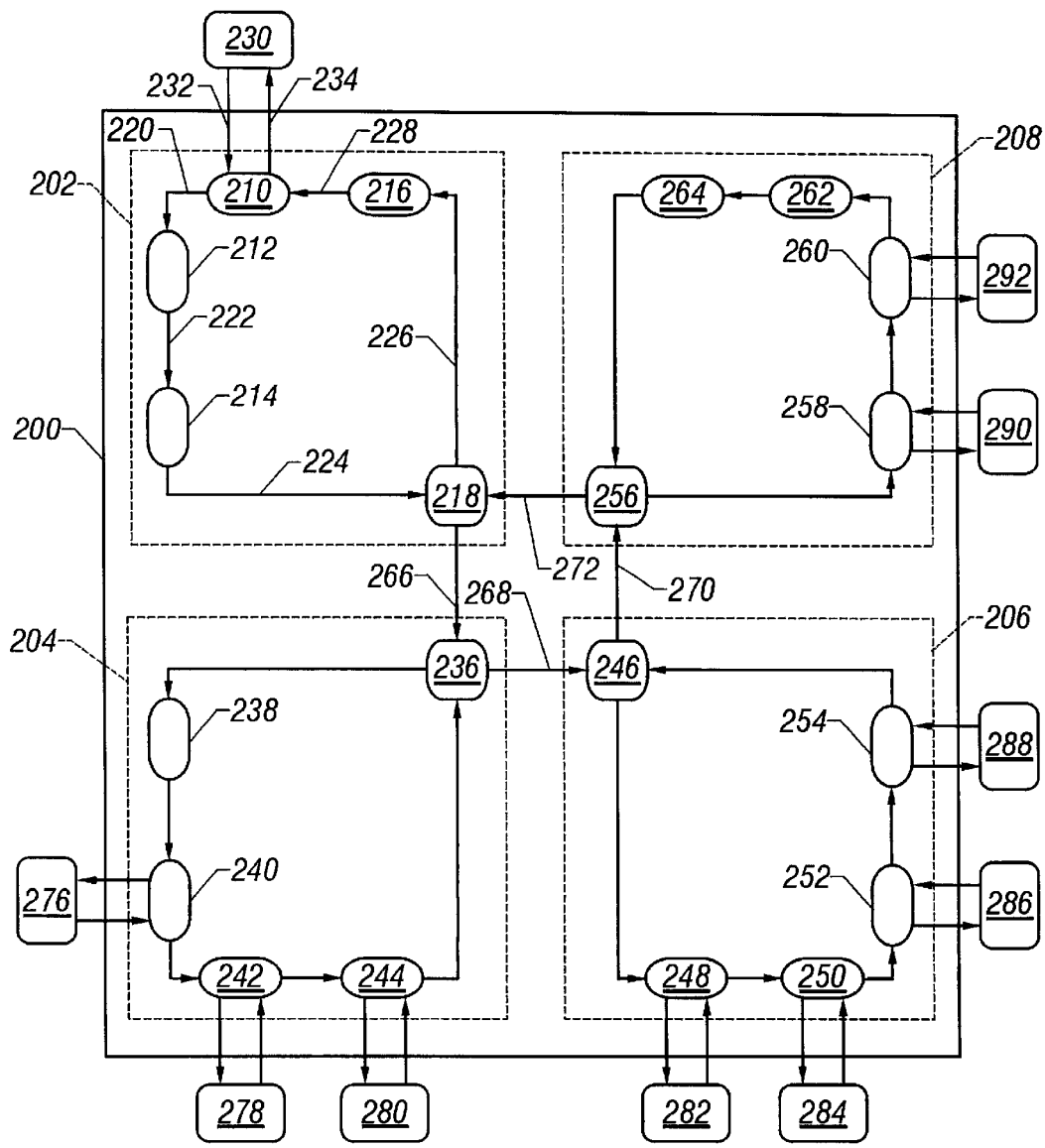
FIG. 2 shows a scalable hub of the preferred embodiment.

The invention will be explained below in the context of a Fibre Channel Arbitrated Loop ("FC-AL") as an illustration of the preferred embodiment. However, the invention may have applicability to networks with similar characteristics as FC-AL networks.

The preferred embodiment provides a scalable hub which is programmable and offers graceful degradation. The scalable nature of the preferred embodiment arises from the interconnection of a plurality of internal hubs along an interhub loop, internal to the scalable hub. As internal hubs are inserted or removed from the interhub loop, the hub ports included in the loop created by the interhub loop change.

The configuration and operation of a scalable hub 200 of the preferred embodiment will be explained with reference to FIG. 2. Scalable hub 200 includes at least two internal hubs; four internal hubs 202, 204, 206, 208 are illustrated. Each internal hub includes one or more hub ports and an internal hub expansion port. As shown in FIG. 2, internal hub 202 includes four hub ports 210, 212, 214, 216 and an internal hub expansion port 218. Hub ports 21 216 and internal hub expansion port 218 are arranged in a loop topology connected by internal hub links 220, 222, 224, 226, 228. The number of hub ports contained in an internal hub is not limited to four, nor is the number necessarily the same in each internal hub of a scalable hub according to the preferred embodiment. A node port may be attached to each hub port. As shown in FIG. 2, a node port 230 is connected to hub port 210. A data channel 232 carries data from node port 230 to hub port 210. A data channel 234 carries data from hub port 210 to node port 230.

Each of the remaining internal hubs 204, 206, 208 include, in the same manner as internal hub 202, one or more hub ports and one internal hub expansion port. As shown in FIG. 2, each internal hub 202–208 includes four hub ports (internal hub 202 includes hub ports 210 216, internal hub 204 includes hub ports 238, 240, 242, 244, internal hub 206 includes hub ports 248, 250, 252, 254, internal hub 208 includes hub ports 258, 260, 262, 264). Each internal hub 202–208 also includes an internal hub expansion port (internal hub 202 includes internal hub expansion port 218, internal hub 204 includes internal hub expansion port 236, internal hub 206 includes internal hub expansion port 246, internal hub 208 includes internal expansion port 256).

Internal hub expansion ports 218, 236, 246, 256 are connected in an interhub loop topology by interhub loop channels 266, 268, 270, 272. In this way, data flows from internal hub 202 through internal hub expansion port 218 and onto interhub loop channel 266. Data then enters internal hub 204 at internal hub expansion port 236. Data leaves internal hub 204 from internal hub expansion port 236 along interhub loop channel 268. Data enters internal hub 206 through internal hub expansion port 246 and leaves on interhub loop channel 270. Data enters internal hub 208 through internal hub expansion port 256 and leaves internal hub 208 on interhub loop channel 272. Data then enters internal hub 202 through internal hub expansion port 218. In this way, the internal hubs of the scalable hub 200 are interconnected and can operate as a single loop, or in combinations of up to four individual loops.

In the preferred embodiment, the datapaths of loops internal to internal hubs are connected to or removed from the interhub loop of the scalable hub through the setting or resetting of an interhub bypass flag for each internal hub expansion port of the internal hub. For example, if the interhub bypass flag for each of internal hub expansion ports 218, 236, 246, 256 shown in scalable hub 200 of FIG. 2 is not set (indicating that internal hubs 202–208 are to be included in the interhub loop of the scalable hub 200), the datapath of the loop flows through each internal hub 202–208.

In a preferred implementation, a scalable hub is composed of multiple integrated circuits ("IC's") providing a flexible construction. In an alternative implementation, a scalable hub is a single IC. In this way, the internal hubs are not physically separable, but rather the connection and disconnection is a function of manipulation of datapaths and bit flags.

Internal hub expansion ports of internal hubs of the scalable hub of the preferred embodiment are preferably implemented as simplified receive/transmit circuits which do not include circuits necessary to provide full hub port functionality to hub ports. Each hub port in a hub (scalable or not, internal or not) is designed to interact with an attached node port, loop segment or other compliant device. Accordingly, hub ports have a necessary amount of circuitry to allow this interaction. For example, the datapath along the internal loop of a hub may be a parallel data bus, but the output to node ports is serial. Thus, a hub port typically includes a serial input/output ("I/O") circuit to generate and receive the serial data expected by the node port in compliance with network protocols, such as in FC-AL networks. In addition, depending upon the configuration of the hub port, additional circuitry may also be provided in the hub port, such as for encoding, detection, or clock recovery.

Preferably, an internal hub expansion port of a scalable hub is completely internal to the scalable hub and does not need the circuitry of a hub port for interacting with a node port. The internal hub expansion port preferably does not communicate directly with a node port or other external device relative to the scalable hub and so only has the circuitry necessary to connect the internal hub which contains the internal hub expansion port to the internal hub expansion port of the next internal hub in the interhub loop of the scalable hub. This configuration results in a reduction in costs and efficiency over a conventional approach of connecting hubs by stringing data channels from hub port to hub port.

The selective interconnection functionality of internal hub expansion ports may be implemented in various ways to provide configurable loop sizes. A simple parallel/serial connection is preferred. A multiplexing circuit or cross-point switch are effective. Alternatively direct gate logic may be used to effect connection and disconnection in response to an interhub bypass flag.

The interhub loop of the scalable hub of the preferred embodiment is 21 bits wide, 20 bits for data and one bit for a clock. The interhub loop is parallel and so offers speedy transfer of data from one internal hub to the next. If the interhub loop bit-width differs from that of the loops in the internal hubs, the internal hub expansion ports preferably include circuitry synchronize the loops. FIG. 3A to 3E illustrate combinations of datapaths resulting from various combinations of interhub bypass flags being set in scalable hub 200 illustrated in FIG. 2. FIG. 3A illustrates the situation where the interhub bypass flags for all four internal hub expansion ports 218, 236, 246, 256 of scalable hub 200 are not set. As a result, all four internal hubs 202–208 of scalable hub 200 are connected to the interhub loop. The datapath resulting from setting all four interhub bypass flags is represented by datapath 300. The flow of data around the loop passes through all hub ports in all four internal hubs 202–208.

FIG. 3B illustrates the resulting datapath when interhub bypass flags for three of internal hub expansion ports 236, 246 and 256 are not set. Internal hubs 204–208 are connected to the interhub loop. The interhub bypass flag of internal hub expansion port 218 is set. As a result, internal hub 202 is not connected to the interhub loop and so has the datapath represented by datapath 302. The remaining internal hubs 204, 206, 208 are connected to the interhub loop and so the datapath along the loop is shown by datapath 304. In this instance, data flows to internal hub expansion port 218 of internal hub 202, but no data enters the internal hub loop of internal hub 202. As a result, node ports attached to internal hubs 204, 206, 208 interact with one another, but these node ports do not interact with node ports attached to internal hub 202.

FIG. 3C illustrates the situation where the interhub bypass flags of two internal hub expansion ports 246 and 256 are not set. Internal hubs 206 and 208 are connected to the interhub loops. The interhub bypass flags for internal hub expansion ports 218 and 236 are set so internal hubs 202 and 204 are isolated and not connected to the interhub loop. This configuration results in three independent loops. One loop is represented by datapath 306, the internal hub loop of internal hub 202. The second loop is represented by datapath 308, the internal hub loop of internal hub 204. The third loop is represented by datapath 310, the combination of the internal hub loops of internal hub 206 and 208 with the interhub loop. Similar to the situation illustrated in FIG. 3B, the datapath 310 does flow into internal hub expansion ports 218 and 236 of internal hubs 202 and 204. However, because the interhub bypass flags of internal hub expansion ports 218, 236 are set, internal hub expansion ports 218, 236 do not connect the internal hub loops of internal hubs 202, 204 to the interhub loop.

FIG. 3D illustrates a situation where an interhub bypass flag of one internal hub expansion port 256 is not set so the internal hub loop of internal hub 208 is connected to the interhub loop. However, because internal hubs 202, 204, 206 have the interhub bypass flag of their respective internal hub expansion ports 218, 236, 246 set, the internal hub loops are not connected to the interhub loop. This configuration results in four independent loops. Internal hubs 202, 204, 206 each has an independent isolated loop represented by datapaths 312, 314, 316 respectively. A fourth loop is represented by datapath 318 where the internal hub loop of internal hub 208 is connected to the interhub loop through internal hub expansion port 256. Datapath 318 flows through internal hub expansion ports 218, 236, 246, 256 of each of internal hubs 202–208. However, because the only interhub bypass flag which is not set (i.e., cleared) is that of internal hub expansion port 256, only the internal hub loop of internal hub 208 is connected to the interhub loop.

FIG. 3E illustrates a similar situation to that shown in FIG. 3D, however, interhub bypass flags for all four internal hub expansion ports 218, 236, 246, 256 of internal hubs 202–208 are set. Each of internal hubs 202–208 is not connected to the interhub loop (the internal hub loop of the internal hub). This configuration results in five independent loops. The first loop is represented by datapath 320, the internal hub loop of internal hub 202. The second loop is represented by datapath 322, the internal hub loop of internal hub 204. The third loop is represented by datapath 324, the internal hub loop of internal hub 206. The fourth is represented by datapath 326, the internal hub loop of internal hub 208. In addition, the interhub loop connects internal hub expansion ports 218, 236, 246, 256 forming datapath 328. Because the interhub bypass flags are set for internal hub expansion ports 218, 236, 246, 256 the internal hub loops of internal hubs 202–208 are not connected to the loop formed by the interhub loop. Thus, no data is preferably present on datapath 328.

As illustrated in FIG. 3A–3E, the interhub loop itself does not change and always connects all of the internal hub expansion ports of the internal hubs contained within the scalable hub of the preferred embodiment. The connection between the interhub loop and the internal hub loop of an internal hub is internal to the internal hub expansion ports and determined by the state of the interhub bypass flag of the internal hub expansion port.

Returning to FIG. 2, multiple node ports are connected to scalable hub 200 where these node ports are connected to different internal hubs 202–208. As illustrated, node port 230 is connected to hub port 210 of internal hub 202; node ports 276, 278, 280 are attached to internal hub 204; node ports 282, 284, 286, 288 are attached to internal hub 206; and node ports 290, 292 are attached to internal hub 208. When all of the interhub bypass flags of internal hub expansion ports 218, 236, 246, 256 are cleared such that internal hubs 202–208 are connected to the interhub loop (recall datapath 300 illustrated in FIG. 3A), all the node ports attached to scalable hub 200 may interact with one another and are transparently available to one another as though connected to a single conventional hub.

To divide the hub ports contained within the scalable hub 200 along the divisions formed by internal hubs 202–208, internal hubs 202–208 may be removed from the interhub loop. More than one hub may be removed at a time. However, any subloop created may only consist of one internal hub or all of the internal hubs in the scalable hub less isolated internal hubs. For example, the configurations shown in FIG. 3A to 3E are all possible and proper configurations under the preferred embodiment. However, a configuration where two internal hubs form one loop and the remaining internal hubs form a second loop is preferably not formed under the preferred embodiment. This restriction arises from the uni-directional nature of the connection of the interhub loop in the preferred embodiment. In an alternative embodiment with more complex interconnections across interhub expansion ports, subloops of varying sizes may be proper. However, in the preferred embodiment, in the interest of speed, simplicity and reduced cost, the interhub loop is a uni-directional connection among internal hub expansion ports. As a result, when an individual internal hub is removed from the interhub loop, that internal hub is isolated and is no longer connected to any of the other internal hubs in the scalable hub. If two internal hubs are removed from an interhub loop at the same time, each of the removed internal hubs is isolated into a separate loop defined by its internal hub loop (recall FIG. 3C, 3D, 3E).

As described above, in the configuration illustrated in FIG. 3B, the interhub bypass flag of internal hub expansion port 218 is set while the interhub bypass flags of remaining interhub expansion ports 236, 246, 256 are not set, resulting in datapaths 302 and 304. Node port 230 is isolated and does not communicate with the other node ports attached to scalable hub 200 as shown in FIG. 2. The remaining node ports are connected through their internal hub loops and the interhub loop and so communicate among one another according to conventional FC-AL protocols. Considering the configuration shown in FIG. 3C, resulting in datapaths 306, 308 and 310, node port 230 is again isolated from the other loops attached to the scalable hub 200. Node ports 276, 278 and 280 are isolated from the other node ports of scalable hub 200, including node port 230. However, node ports 276, 278 and 280 may communicate among one another along the internal hub loop of internal hub 204. Remaining node ports 282, 284, 286, 288, 290, 292 are connected through their internal hub loops and the interhub loop, and so freely communicate among one another, though isolated from node ports attached to internal hub 202 and 204.

The setting and resetting of interhub bypass flags of internal hub expansion ports may be manually controlled external to the scalable hub or alternatively may be controlled via data sequences introduced to the scalable hub. In addition, internal hub expansion ports may contain detection circuitry which detects the failure of node ports or data channels within the internal hub to which the internal hub expansion port is connected. Thus, an internal hub expansion port may automatically disconnect the internal hub from the interhub loop of the scalable hub.

Graceful degradation is also provided by the scalable hub of the preferred embodiment. Graceful degradation provides that, upon the failure of an internal hub necessitating removal from the interhub loop of the scalable hub, the interhub loop persists such that the remaining internal hubs connected to the interhub loop are not isolated in turn. For example, if scalable hub 200 illustrated in FIG. 2 has all four internal hubs 202–208 connected to the interhub loop, the datapath is that of datapath 300 illustrated in FIG. 3A. Upon the failure of internal hub 202, for example, the remaining internal hubs 204, 206, 208 remain attached to the interhub loop. Under the preferred embodiment's graceful degradation functionality, upon the failure of internal hub 202, internal hub 202 is isolated from internal hubs 204, 206, 208 attached to the interhub loop. Internal hubs 204, 206, 208 attached to the interhub loop will maintain their interhub loop connection through internal hub expansion ports 236, 246, 256. Node ports attached to internal hubs 204, 206, 208 still freely interact. In an alternative embodiment, a scalable hub does not provide graceful degradation. However, without graceful degradation, the failure of an internal hub may result in an indeterminate state. A likely result is the isolation of all internal hubs from one another. This isolation is generally not a desirable result and detracts from the advantages provided by the interhub loop connection of a scalable hub. A cost-savings may be achieved, however, in such an embodiment.

Internal hubs may be isolated deliberately for various reasons such as security or optimization. The ability to isolate internal hubs upon demand while the scalable hub is in operation allows for parallel network testing of each internal hub. Setting bits in the preferred embodiment of the scalable hub is a simpler and more efficient means than the physical connection and disconnection of cables to ports. The ability to efficiently isolate and reinsert internal hubs from a interhub loop improves loop analysis for diagnostic purposes in terms of error detection, source of error determination, and statistical observation for performance evaluation purposes.

In an alternative embodiment, the setting of the interhub bypass flags may be controlled automatically by a diagnostic program or circuit. The diagnostic program would then be able to isolate internal hubs within the scalable hub as necessary to more efficiently isolate the source of an error anomaly.

The insertion and removal of internal hubs allows the insertion and removal of groups of hub ports in a scalable hub rather than bypassing only individual hub ports. In addition the hub ports removed form the interhub loop are still connected in the internal loop of the internal hub and so may continue loop communication limited to the hub ports in the internal loop.

The preferred embodiment allows for a flexible arrangement of internal hubs within a larger scalable hub and so allows a flexible set of associated nodes to interact with each other under conventional FC-AL protocols.

Various embodiments of the invention have been described. However, the scope of the present invention is not limited to the embodiments described but rather only by the scope of the following claims.

What is claimed is:

1. A scalable hub comprising:
   (a) a plurality of Fibre Channel internal hubs;
   (b) a plurality of Fibre Channel hub ports divided among the internal hubs such that each internal hub includes at least one hub port;
   (c) a plurality of Fibre Channel internal hub expansion ports, where each is connected to the at least one hub port in one internal hub and includes an interhub bypass flag;
   (d) a plurality of Fibre Channel loop lines connecting the at least one hub port and the internal expansion port within each internal hub to form a first uni-directional loop within each internal hub; and
   (e) a plurality of Fibre Channel interhub loop channels to connect the internal hub expansion ports in a uni-directional interhub loop, where each internal hub expansion port is connected to two adjacent internal hub expansion ports and only a single interhub loop channel exists between two adjacently connected internal hub expansion ports, and where each internal hub expansion port connects its first uni-directional loop to two interhub loop channels respectively connected to two adjacent internal hub expansion ports when an associated bypass flag is not set, and connects two interhub loop channels of two adjacent internal hub expansion ports to each other to isolate its first uni-directional loop when the associated bypass flag is set.

2. The scalable hub of claim 1 where at least one internal hub includes at least two hub ports.

3. A scalable hub comprising:
   (a) at least three Fibre Channel internal hubs, each including a uni-directional loop which has an internal hub expansion port;
   (b) at least three Fibre Channel interhub loop channels interconnecting the internal hub expansion ports of the internal hubs in a uni-directional interhub loop so that only a single interhub loop channel exists between two mutually connected internal hub expansion ports, where each internal hub expansion port connects or disconnects its first uni-directional loop of the internal hub which includes such internal hub expansion port to the uni-directional interhub loop in response to an associated interhub bypass flag; and
   (c) at least one Fibre Channel node port connected to one of the internal hubs.

4. A scalable hub comprising:
   (a) a plurality of Fibre Channel internal hubs each configurable as a uni-directional loop;
   (b) a plurality of Fibre Channel internal hub expansion ports, each included in one internal hub;
   (c) a plurality of interhub bypass flags, each associated with one internal hub expansion port;
   (d) a plurality of interhub loop channels interconnecting the internal hub expansion ports in a uni-directional interhub loop to connect one internal hub expansion port to two adjacent internal hub expansion ports with a single interhub loop channel between two internal hub expansion ports connected to each other, where each internal hub expansion port connects or disconnects its associated internal hub which includes such internal hub expansion port to the uni-directional interhub loop in response to the interhub bypass flag associated with such internal hub expansion port.

5. A method of connecting and disconnecting a plurality of Fibre Channel nodes in a Fibre Channel uni-directional loop path network, the method comprising:
   dividing the plurality of nodes into at least three uni-directional groups wherein nodes in each group are connected to form a uni-directional loop;
   connecting one uni-directional group to two adjacent uni-directional groups so that a single uni-directional link exist between two adjacent uni-directional groups that are connected to each other;
   associating a loop bypass flag with each uni-directional group of nodes;
   disconnecting a uni-directional group of nodes from the loop path network when the loop bypass flag associated with such uni-directional group of nodes is set while still maintaining nodes in the disconnected in its associated uni-directional loop; and
   connecting a uni-directional group of nodes to the uni-directional loop path network when the loop bypass flag associated with such uni-directional group of nodes is not set.

6. The method of claim 5 where a uni-directional group of nodes is disconnected from the uni-directional loop path network when the loop bypass flag is associated with such uni-directional group of nodes such that the remaining uni-directional groups of nodes maintain their present state of connection or disconnection with the uni-directional loop path network.

7. The method as in claim 5, further comprising setting the loop bypass flag associated with a uni-directional group of nodes to disconnect the group in response to a first control signal when there is no failure in any node of the group.

8. The method of claim 7, wherein the first control signal includes a data sequence introduced into the group.

* * * * *